(12) United States Patent
Robertson et al.

(10) Patent No.: US 8,993,136 B2
(45) Date of Patent: *Mar. 31, 2015

(54) HEATING SYSTEM FOR A BATTERY MODULE AND METHOD OF HEATING THE BATTERY MODULE

(75) Inventors: David C. Robertson, Chicago, IL (US); Daniel K. McNeill, Lake Orion, MI (US)

(73) Assignee: LG Chem, Ltd., Seoul (KR)

( * ) Notice: Subject to any disclaimer, the term of this patent is extended or adjusted under 35 U.S.C. 154(b) by 448 days.

This patent is subject to a terminal disclaimer.

(21) Appl. No.: 13/173,288

(22) Filed: Jun. 30, 2011

(65) Prior Publication Data

US 2013/0004804 A1    Jan. 3, 2013

(51) Int. Cl.
  H01M 10/50     (2006.01)
  H01M 10/615    (2014.01)
  H01M 10/633    (2014.01)
  H01M 10/6563   (2014.01)
  H01M 10/6571   (2014.01)
  H01M 10/052    (2010.01)

(52) U.S. Cl.
  CPC ........ *H01M 10/5006* (2013.01); *H01M 10/052* (2013.01); *H01M 10/5022* (2013.01); *H01M 10/5067* (2013.01); *H01M 10/5083* (2013.01); *Y02T 10/7011* (2013.01)
  USPC .............................................. 429/50; 429/62

(58) Field of Classification Search
  CPC ...................... H01M 10/5083; H01M 10/5067
  USPC ...................................................... 429/62, 50
  See application file for complete search history.

(56) References Cited

U.S. PATENT DOCUMENTS

| 4,390,841 A | 6/1983 | Martin et al. |
| 5,578,915 A | 11/1996 | Crouch, Jr. et al. |
| 5,606,242 A | 2/1997 | Hull et al. |
| 5,644,212 A | 7/1997 | Takahashi |
| 5,652,502 A | 7/1997 | van Phuoc et al. |

(Continued)

FOREIGN PATENT DOCUMENTS

| JP | 9243716 A | 9/1997 |
| JP | 9312901 A | 12/1997 |

(Continued)

OTHER PUBLICATIONS

International Search Report dated Jul. 25, 2005 for International Application No. PCT/KR2004/003103.

(Continued)

*Primary Examiner* — Nicholas P D'Aniello
(74) *Attorney, Agent, or Firm* — Buckert Patent & Trademark Law Firm, PC; John F. Buckert

(57) ABSTRACT

A heating system and a method for heating a battery module are provided. The method includes determining if a temperature signal indicates that the temperature level of the battery module is less than a threshold temperature level. If the temperature level is less than a threshold temperature level, and a first battery cell group is not electrically balanced with a second battery cell group, then the method includes selecting at least one of the first and second battery cell groups to be at least partially discharged. If the first battery cell group is selected, then the method includes partially discharging the first battery cell group through a first resistor to generate heat energy.

12 Claims, 5 Drawing Sheets

(56) References Cited

U.S. PATENT DOCUMENTS

| | | |
|---|---|---|
| 5,658,682 A | 8/1997 | Usuda et al. |
| 5,694,335 A | 12/1997 | Hollenberg |
| 5,701,068 A | 12/1997 | Baer et al. |
| 5,714,866 A | 2/1998 | S et al. |
| 5,739,670 A | 4/1998 | Brost et al. |
| 5,796,239 A | 8/1998 | van Phuoc et al. |
| 5,825,155 A | 10/1998 | Ito et al. |
| 5,936,385 A | 8/1999 | Patillon et al. |
| 6,016,047 A | 1/2000 | Notten et al. |
| 6,064,180 A | 5/2000 | Sullivan et al. |
| 6,160,376 A | 12/2000 | Kumar et al. |
| 6,232,744 B1 | 5/2001 | Kawai et al. |
| 6,285,163 B1 | 9/2001 | Watanabe et al. |
| 6,329,823 B2 | 12/2001 | Blessing et al. |
| 6,353,815 B1 | 3/2002 | Vilim et al. |
| 6,359,419 B1 | 3/2002 | Verbrugge et al. |
| 6,362,598 B2 | 3/2002 | Laig-Horstebrock et al. |
| 6,441,586 B1 | 8/2002 | Tate, Jr. et al. |
| 6,515,454 B2 | 2/2003 | Schoch |
| 6,534,954 B1 | 3/2003 | Plett |
| 6,563,318 B2 | 5/2003 | Kawakami et al. |
| 6,583,606 B2 | 6/2003 | Koike et al. |
| 6,608,482 B2 | 8/2003 | Sakai et al. |
| 6,646,421 B2 | 11/2003 | Kimura et al. |
| 6,661,201 B2 | 12/2003 | Ueda et al. |
| 6,724,172 B2 | 4/2004 | Koo |
| 6,829,562 B2 | 12/2004 | Sarfert |
| 6,832,171 B2 | 12/2004 | Barsoukov et al. |
| 6,876,175 B2 | 4/2005 | Schoch |
| 6,892,148 B2 | 5/2005 | Barsoukov et al. |
| 6,919,952 B2 | 7/2005 | Kruit |
| 6,927,554 B2 | 8/2005 | Tate, Jr. et al. |
| 6,943,528 B2 | 9/2005 | Schoch |
| 6,967,466 B2 | 11/2005 | Koch |
| 6,984,961 B2 | 1/2006 | Kadouchi et al. |
| 7,012,434 B2 | 3/2006 | Koch |
| 7,039,534 B1 | 5/2006 | Ryno et al. |
| 7,061,246 B2 | 6/2006 | Dougherty et al. |
| 7,072,871 B1 | 7/2006 | Tinnemeyer |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,136,762 B2 | 11/2006 | Ono |
| 7,138,775 B2 | 11/2006 | Sugimoto et al. |
| 7,197,487 B2 | 3/2007 | Hansen et al. |
| 7,199,557 B2 | 4/2007 | Anbuky et al. |
| 7,233,128 B2 | 6/2007 | Brost et al. |
| 7,250,741 B2 | 7/2007 | Koo et al. |
| 7,253,587 B2 | 8/2007 | Meissner |
| 7,315,789 B2 | 1/2008 | Plett |
| 7,317,300 B2 | 1/2008 | Sada et al. |
| 7,321,220 B2 | 1/2008 | Plett |
| 7,327,147 B2 | 2/2008 | Koch |
| 7,400,115 B2 | 7/2008 | Plett |
| 7,424,663 B2 | 9/2008 | Mehalel |
| 7,446,504 B2 | 11/2008 | Plett |
| 7,518,339 B2 | 4/2009 | Schoch |
| 7,521,895 B2 | 4/2009 | Plett |
| 7,525,285 B2 | 4/2009 | Plett |
| 7,583,059 B2 | 9/2009 | Cho |
| 7,589,532 B2 | 9/2009 | Plett |
| 7,593,821 B2 | 9/2009 | Plett |
| 7,893,694 B2 | 2/2011 | Plett |
| 2003/0015993 A1 | 1/2003 | Misra et al. |
| 2003/0162084 A1 | 8/2003 | Shigeta et al. |
| 2003/0184307 A1 | 10/2003 | Kozlowski et al. |
| 2005/0100786 A1 | 5/2005 | Ryu et al. |
| 2005/0127874 A1 | 6/2005 | Lim et al. |
| 2006/0100833 A1 | 5/2006 | Plett |
| 2007/0120533 A1 | 5/2007 | Plett |
| 2008/0094035 A1 | 4/2008 | Plett |
| 2008/0213652 A1* | 9/2008 | Scheucher ............ 429/62 |
| 2008/0249725 A1 | 10/2008 | Plett |
| 2009/0327540 A1 | 12/2009 | Robertson et al. |
| 2011/0003182 A1* | 1/2011 | Zhu ................ 429/50 |

FOREIGN PATENT DOCUMENTS

| | | |
|---|---|---|
| JP | 11003505 A | 1/1999 |
| JP | 11023676 A | 1/1999 |
| JP | 11032442 A | 2/1999 |
| JP | 11038105 A | 2/1999 |
| JP | 2002228730 A | 8/2002 |
| JP | 2002319438 A | 10/2002 |
| JP | 2002325373 A | 11/2002 |
| JP | 2003516618 A | 5/2003 |
| JP | 2003249271 A | 9/2003 |
| JP | 2003257501 A | 9/2003 |
| JP | 2004031014 A | 1/2004 |
| JP | 2004521365 A | 7/2004 |
| JP | 2006516326 A | 6/2009 |
| JP | 2010262879 A | 11/2010 |
| KR | 19970024432 A | 5/1997 |
| KR | 20020026428 A | 4/2002 |
| WO | WO0067359 A1 | 11/2000 |

OTHER PUBLICATIONS

International Search Report dated Mar. 31, 2005 for International Application No. PCT/KR2004/003332.

International Search Report dated Dec. 1, 2006 for International Application No. PCT/KR2006/003305.

S. Moore, P. Schneider; A review of Cell Equalization Methods for Lithium Ion and Lithium Polymer Battery Systems; 2001 Society of Automotive Engineers; Jan. 2001; pp. 1-5.

G. Plett; Advances in EKF SOC Estimation for LiPB HEV Battery Packs; Powering Sustainable Transportation EVS 20; Nov. 15-19, 2003; Long Beach, CA; pp. 1-12.

G. Welch, G. Bishop; An Introduction to the Kalman Filter; SIGGRAPH 2001 Course 8; Los Angeles, CA; Aug. 12-17, 2001; http//info.acm.org/pubs/toc/CRnotice.html, pp. 1-80.

E. Wan, A. Nelson; Dual Extended Kalman Filter Methods; Kalman Filtering and Neural Networks; 2001; pp. 123-173.

Yon et al.; Dynamic Multidimensional Wavelet Neural Network and its Application; Journal of Advanced Computational Intelligence and Intelligent Informatics; 2000; vol. 4, No. 5; pp. 336-340.

Fletcher et al; Estimation from Lossy Sensor Data: Jump Linear Modeling and Kalman Filtering; IPSN Apr. 26-27, 2004; Berkeley, California; pp. 251-258.

G. Plett; Extended Kalman Filtering for Battery Managements System of LiPB-based HEV Battery Packs—Part 1 Background; Journal of Power Sources 134; 2004; pp. 252-261.

G. Plett; Extended Kalman Filtering for Battery Managements System of LiPB-based Hev Battery Packs—Part 2 Background; Journal of Power Sources 134; 2004; pp. 262-276.

G. Plett; Extended Kalman Filtering for Battery Managements System of LiPB-based HEV Battery Pack—Part 3 Background; Journal of Power Sources 134; 2004; pp. 277-283.

G. Plett; Kalman-Filter SOC Estimation for LiPB HEV Cells; The 19th International Battery, Hybrid and Fuel Electric Vehicle Symposium and Exhibition; Oct. 19-23, 2002; Busan, Korea; pp. 1-12.

G. Plett; LiPB Dynamic Cell Models for Kalman-Filter Soc Estimation; The 19th International Battery, Hybrid and Fuel Electric Vehicle Symposium and Exhibition; Oct. 19-23, 2002; Busan, Korea; pp. 1-12.

S.C. Rutan; Recursive Parameter Estimation; 1990; Journal of Chemometrics; vol. 4; pp. 103-121.

P. Maybeck; Stochastic models, estimation and control, vol. 1; 1979; Academic Press Inc., 32 pp.

T. Hansen, C.J. Wang; Support vector based battery state of charge estimator; Journal of Power Sources, 2004; 6391; pp. 1-8.

V. Johnson et al.; Temperature-Dependent Battery Models for High-Power Lithium-Ion Batteries; Jan. 2001; NREL/CP-540-28716; 17th Annual Electric Vehicle Symposium Oct. 15-18, 2000.

U.S. Appl. No. 12/819,617, filed Jun. 21, 2010 entitled Voltage Management Methods and Systems for Performing Analog-to-Digital Conversions.

(56) References Cited

OTHER PUBLICATIONS

U.S. Appl. No. 12/822,285, filed Jun. 24, 2010 entitled Battery Management System and Method for Transferring Data within the Battery Management System.

U.S. Appl. No. 12/870,940, filed Aug. 30, 2010 entitled Systems and Methods for Determining a Warranty Obligation of a Supplier to an Original Equipment Manufacturer for a Vehicle Battery Pack.

U.S. Appl. No. 13/093,187, filed Apr. 25, 2011 entitled Battery System and Method for Increasing an Operational Life of a Battery Cell.

* cited by examiner

| COMPUTER SELECTS THE FIRST BATTERY CELL GROUP IF THE FIRST VOLTAGE LEVEL IS GREATER THAN THE SECOND VOLTAGE LEVEL BASED ON THE FIRST AND SECOND SIGNALS | ─270 |

FIG. 5

| COMPUTER SELECTS THE SECOND BATTERY CELL GROUP IF THE SECOND VOLTAGE LEVEL IS GREATER THAN THE FIRST VOLTAGE LEVEL BASED ON THE FIRST AND SECOND SIGNALS | ─280 |

FIG. 6

| COMPUTER SELECTS THE FIRST BATTERY CELL GROUP IF A FIRST STATE-OF-CHARGE OF THE FIRST BATTERY CELL GROUP IS GREATER THAN A SECOND STATE-OF-CHARGE OF THE SECOND BATTERY CELL GROUP | ─290 |

FIG. 7

| COMPUTER SELECTS THE SECOND BATTERY CELL GROUP IF A FIRST STATE-OF-CHARGE OF THE SECOND BATTERY CELL GROUP IS GREATER THAN A SECOND STATE-OF-CHARGE OF THE FIRST BATTERY CELL GROUP | ─300 |

FIG. 8

HEATING SYSTEM FOR A BATTERY MODULE AND METHOD OF HEATING THE BATTERY MODULE

BACKGROUND

When electric vehicle batteries have relatively cold internal temperatures, an amount of electrical power that can be supplied by the batteries can be lower than a desired electrical power level.

The inventors herein have recognized a need for an improved heating system for a battery module and a method of heating the battery module to reduce and/or eliminate the above-mentioned deficiency.

SUMMARY

A heating system for a battery module in accordance with an exemplary embodiment is provided. The battery module has first and second battery cell groups. The heating system includes a first voltage sensor configured to generate a first signal indicative of a first voltage level being output by the first battery cell group. The heating system further includes a second voltage sensor configured to generate a second signal indicative of a second voltage level being output by the second battery cell group. The heating system further includes a first resistor configured to be electrically coupled to the first battery cell group when first, second, and third switches each have a first operational position. The heating system further includes a temperature sensor configured to generate a temperature signal indicative of a temperature level of at least one of the first battery cell group and the second battery cell group. The computer is further configured to determine if the temperature signal indicates that the temperature level is less than a threshold temperature level. The computer is further configured to determine if the first battery cell group is electrically balanced with the second battery cell group based on the first and second signals. If the temperature level is less than the threshold temperature level, and the first battery cell group is not electrically balanced with the second battery cell group, then the computer is further configured to select at least one of the first and second battery cell groups to be at least partially discharged. If the first battery cell group is selected, then the computer is further configured to generate first, second, and third control signals to induce the first, second, and third switches, respectively, to each have the first operational position to at least partially discharge the first battery cell group through the first resistor to generate heat energy in the first resistor, and the computer is further configured to generate a fourth control signal to turn on a fan to distribute the heat energy in the battery module to increase the temperature level of the battery module.

A method for heating a battery module in accordance with another exemplary embodiment is provided. The battery module has first and second battery cell groups. The method includes generating a first signal indicative of a first voltage level being output by the first battery cell group utilizing a first voltage sensor. The method further includes generating a second signal indicative of a second voltage level being output by the second battery cell group utilizing a second voltage sensor. The method further includes generating a temperature signal indicative of a temperature level of at least one of the first battery cell group and the second battery cell group utilizing a temperature sensor. The method further includes determining if the temperature signal indicates that the temperature level is less than a threshold temperature level utilizing a computer. The method further includes determining if the first battery cell group is electrically balanced with the second battery cell group based on the first and second signals utilizing the computer. If the temperature level is less than the threshold temperature level, and the first battery cell group is not electrically balanced with the second battery cell group, then the method further includes selecting at least one of the first and second battery cell groups to be at least partially discharged utilizing the computer. If the first battery cell group is selected, then the method further includes generating first, second, and third control signals to induce first, second, and third switches, respectively, to each have a first operational position to at least partially discharge the first battery cell group through a first resistor to generate heat energy in the first resistor utilizing the computer, and generating a fourth control signal to turn on a fan to distribute the heat energy in the battery module to increase a temperature level of the battery module utilizing the computer.

BRIEF DESCRIPTION OF THE DRAWINGS

FIGS. 2-8 are flowcharts of a method for heating a battery module in accordance with another exemplary embodiment.

DETAILED DESCRIPTION

Figure 1:
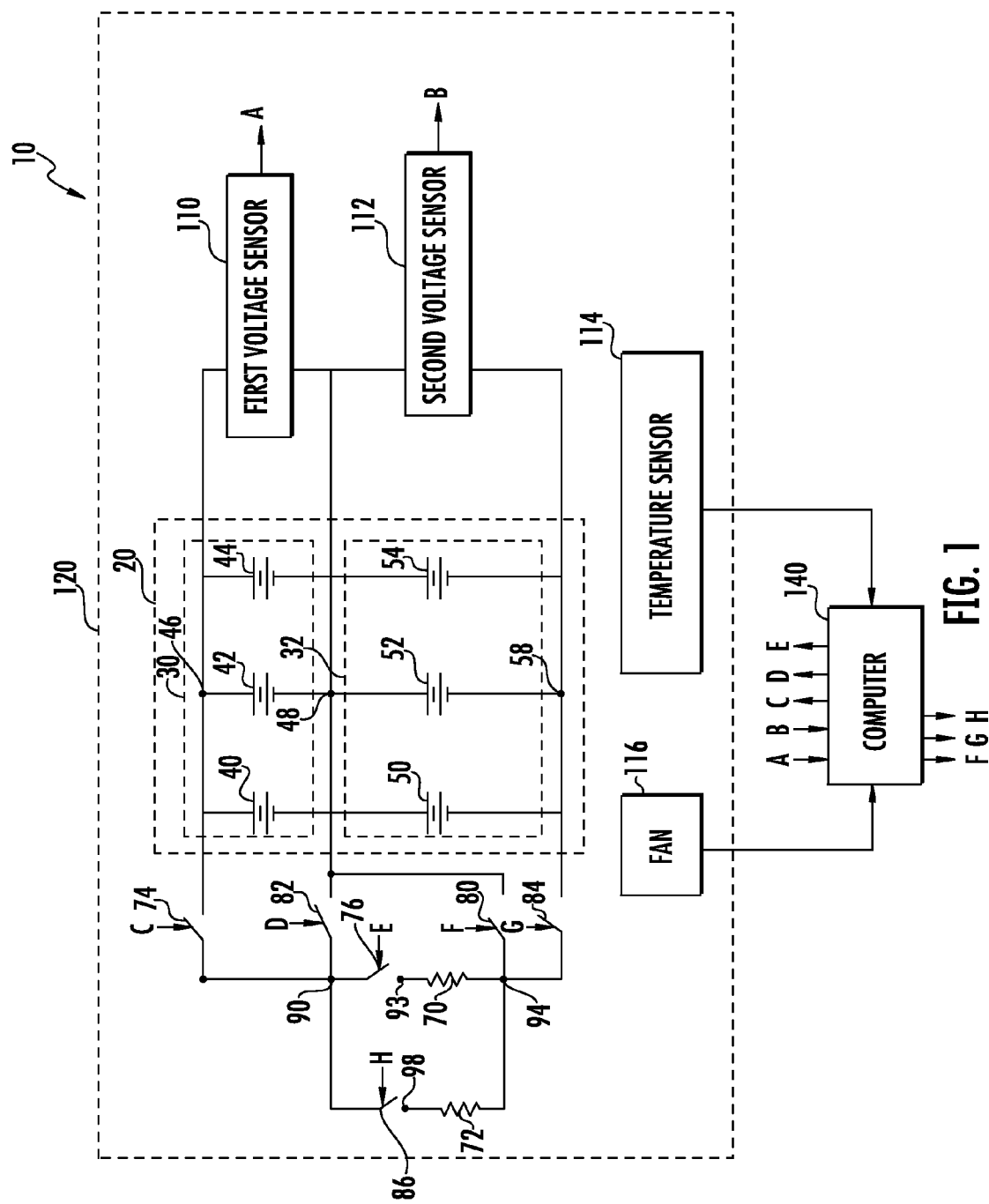
FIG. 1 is a schematic of a heating system for a battery module in accordance with an exemplary embodiment.

Referring to FIG. 1, a heating system 10 for heating a battery module 20, in accordance with an exemplary embodiment is provided. An advantage of the heating system 10 is that the system utilizes balancing resisters for generating heat energy to increase the temperature of the battery module 20 greater than or equal to a threshold temperature level while electrically balancing battery cells in the module 20. For purposes of understanding, the term "electrically balanced" means that two or more battery cells (or two or more battery cell groups) have substantially equal output voltages or substantially equal state-of-charges. The term "electrically balancing" means discharging one or more battery cells (or two or battery cell groups) to adjust one or more associated output voltages toward one another, or to adjust one or more associated state-of-charges toward one another. The term "resistor" means one or more electrical components that dissipate electrical power through an internal impedance. For example, a resistor could comprise at least one of a carbon-based electrically resistive component, a wire-bound electrically resistive component, and a heating coil.

The battery module 20 includes a first battery cell group 30 and a second battery cell group 32. The first battery cell group 30 includes battery cells 40, 42, 44 that are electrically coupled in parallel to one another between nodes 46 and 48. In an alternative embodiment, the first battery cell group 30 could have less than three battery cells or greater than three battery cells electrically coupled in parallel therein. In one exemplary embodiment, the battery cells 40, 42, 44 are lithium-ion pouch type battery cells. Of course, in an alternative embodiment, the battery cells 40, 42, 44 could be other types of battery cells known to those skilled in the art.

The second battery cell group 32 includes battery cells 50, 52, 54 that are electrically coupled in parallel to one another between nodes 48, 58. In an alternative embodiment, the second battery cell group 32 could have less than three battery cells or greater than three battery cells electrically coupled in parallel therein. In one exemplary embodiment, the battery cells 50, 52, 54 are lithium-ion pouch-type battery cells. Of course, in an alternative embodiment, the battery cells 50, 52, 54 could be other types of battery cells known to those skilled in the art.

The heating system 10 is provided to increase a temperature level of the battery module 20 when the temperature level falls below a threshold temperature level. The heating system 10 includes a first resistor 70, a second resistor 72, a first switch 74, a second switch 76, a third switch 80, a fourth switch 82, a fifth switch 84, a sixth switch 86, a first voltage sensor 110, a second voltage sensor 112, a temperature sensor 114, a fan 116, a housing 120, and a computer 140.

The first resistor 70 is electrically coupled between nodes 93, 94. The first switch 74 is electrically coupled between the nodes 90, 46; and the second switch 76 is electrically coupled between nodes 90, 93. Further, the third switch 80 is electrically coupled between the nodes 94, 48; and the fourth switch is electrically coupled between the nodes 90, 48. Also, the fifth switch 84 is electrically coupled between the nodes 94, 58; and the sixth switch 86 is electrically coupled between the nodes 90, 98. Further, the second resistor 72 is electrically coupled between the nodes 98, 94. The resistance value of the first resistor 70 is based on the capacity (e.g., ampere-hours) of either the first battery cell group 30 or the second battery cell group 32. The resistance value of the second resistor 72 is based on the capacity (e.g., ampere-hours) of the combination of the first battery cell group 30 and the second battery cell group 32. In particular, the resistance value of the second resistor 72 is greater than a resistance value of the first resistor 70.

When the first switch 74, the second switch 76, and the third switch 80 each have a first operational position (e.g., a closed operational position) in response to respective control signals from the computer 140; and the fourth switch 82, the fifth switch 84, and the sixth switch 86 each have a second operational position (e.g., an open operational position), then the first battery cell group 30 generates an electrical current that flows through the first resistor 70 to generate heat energy therein to increase a temperature level of the battery module 20 and to at least partially discharge the first battery cell group 30. Also, when the first switch 74, the second switch 76, and the third switch 80 each have a second operational position (e.g., an open operational position) in response to the respective control signals no longer being supplied by the computer 140, the electrical current from the first battery cell group 30 no longer flows through the first resistor 70.

When the second switch 76, the fourth switch 82, and the fifth switch 84 each have a first operational position (e.g., a closed operational position) in response to respective control signals from the computer 140; and the first switch 74, the third switch 80, and the sixth switch 86 each have a second operational position (e.g., an open operational position), then the second battery cell group 32 generates an electrical current that flows through the first resistor 70 to generate heat energy therein to increase a temperature level of the battery module 20 and to at least partially discharge the second battery cell group 32. Also, when the second switch 76, the fourth switch 82, and the fifth switch 84 each have a second operational position (e.g., an open operational position) in response to the respective control signals no longer being supplied by the computer 140, the electrical current from the second battery cell group 32 no longer flows through the first resistor 70.

When the first switch 74, the fifth switch 84, and the sixth switch 86 each have a first operational position (e.g., a closed operational position) in response to respective control signals from the computer 140; and the second switch 76, the third switch 80, and the fourth switch 82 each have a second operational position (e.g., an open operational position), then the first and second battery cell groups 30, 32 generate an electrical current that flows through the second resistor 72 to generate heat energy therein to increase a temperature level of the battery module 20 and to at least partially discharge the first and second battery cell groups 30, 32. Also, when the first switch 74, the fifth switch 84, and the sixth switch 86 each have a second operational position (e.g., an open operational position) in response to the respective control signals no longer being supplied by the computer 140, the electrical current from the first and second battery cell groups 30, 32 no longer flows through the second resistor 72.

The first voltage sensor 110 is electrically coupled between the nodes 46, 48. The first voltage sensor 110 is configured to generate a first signal indicative of a first voltage level being output by the first battery cell group 30, that is received by the computer 140.

The second voltage sensor 112 is electrically coupled between the nodes 48, 58. The second voltage sensor 112 is configured to generate a second signal indicative of a second voltage level being output by the second battery cell group 32, that is received by the computer 140.

The temperature sensor 114 is disposed proximate to the first and second battery cell groups 30, 32. The temperature sensor 114 is configured to generate a temperature signal indicative of a temperature level of at least one of the first battery cell group 30 and the second battery cell group 32 that is received by the computer 140.

The fan 116 is disposed proximate to the first resistor 70 and to the second resistor 72. The fan 116 is configured to circulate air or another gas past the first and second resistors 70, 72 when the fan 116 is turned on to distribute heat energy from the resistors 70, 72 to the battery module 34 to increase a temperature level of the battery cells therein. The fan 116 is turned on by a control signal from the computer 140 and is turned off when the control signal is no longer supplied to the fan 116 by the computer 140.

The housing 120 is provided to enclose the first resistor 70, the second resistor 72, the first switch 74, the second switch 76, the third switch 80, the fourth switch 82, the fifth switch 84, the sixth switch 86, the first voltage sensor 110, the second voltage sensor 112, the temperature sensor 114, and the fan 116. In one exemplary embodiment, the computer 140 is disposed outside of the housing 120. Of course, in an alternative embodiment, the computer 140 may be disposed inside of the housing 120. In one exemplary embodiment, the housing 120 may be constructed of plastic. Of course, in an alternative embodiment, the housing 120 could be constructed of other materials known to those skilled in the art, such as stainless steel for example.

The computer 140 is electrically coupled to the first switch 74, the second switch 76, the third switch 80, the fourth switch 82, the fifth switch 84, the sixth switch 86, the first voltage sensor 110, the second voltage sensor 112, the temperature sensor 114, and the fan 116. The computer 140 has an internal memory device for storing executable software instructions and associated data for implementing the method for heating the battery module 20 that will be explained in greater detail below. In one exemplary embodiment, the computer 140 comprises a microprocessor operably coupled to a memory device. Of course, in alternative embodiments, the computer 140 could comprise a programmable logic controller or a field programmable logic array.

Figure 2:
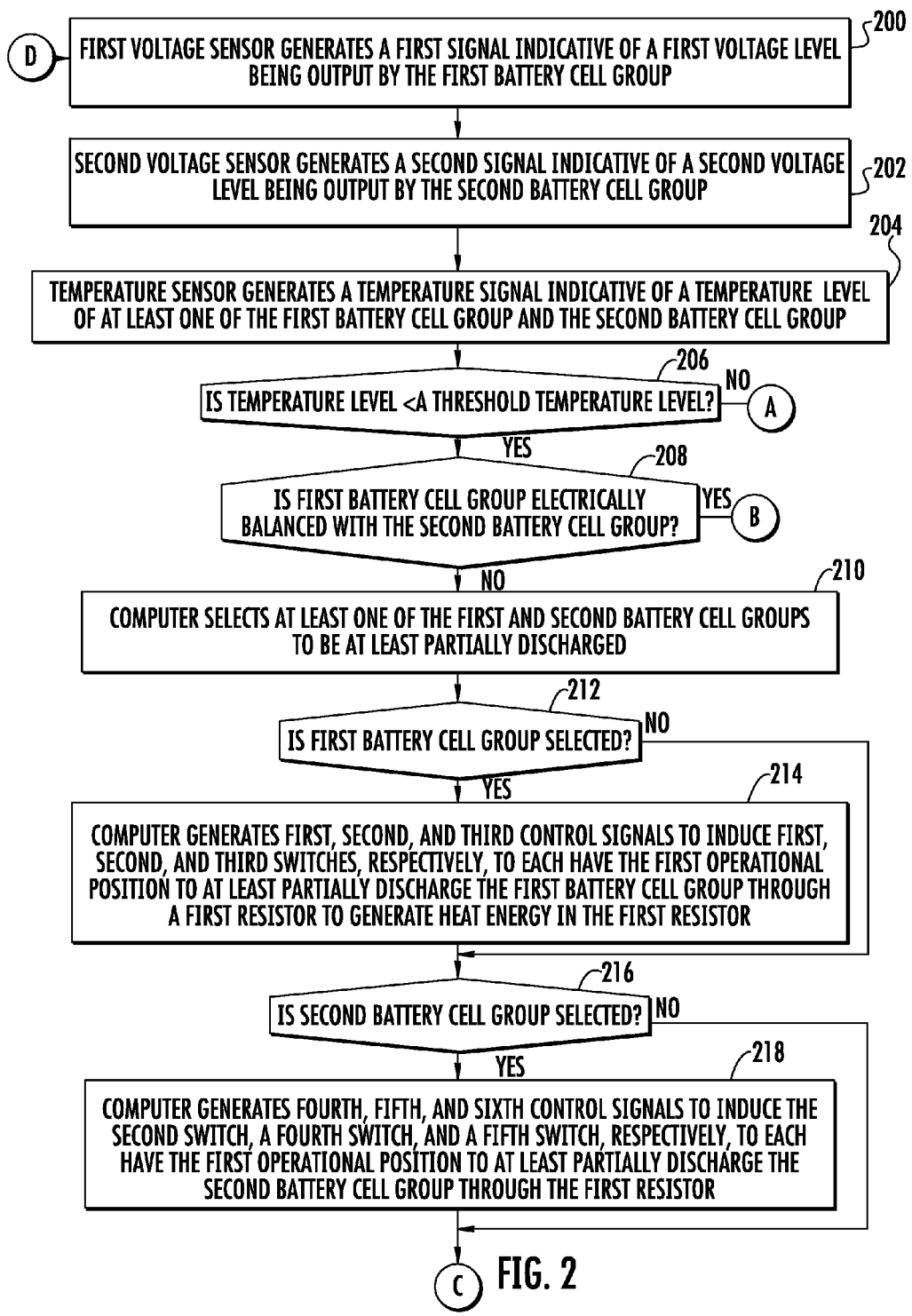
Figure 3:
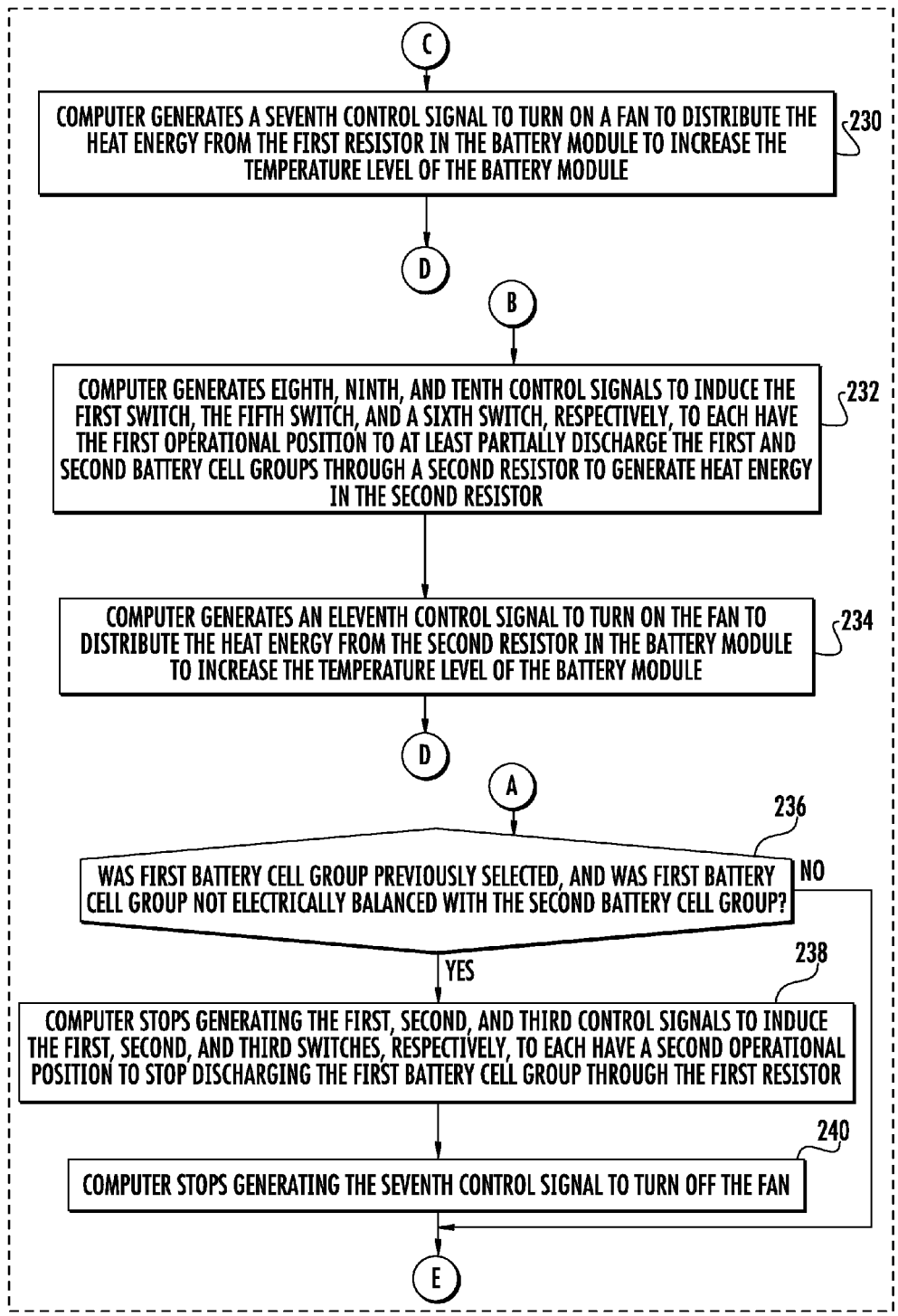
Figure 4:
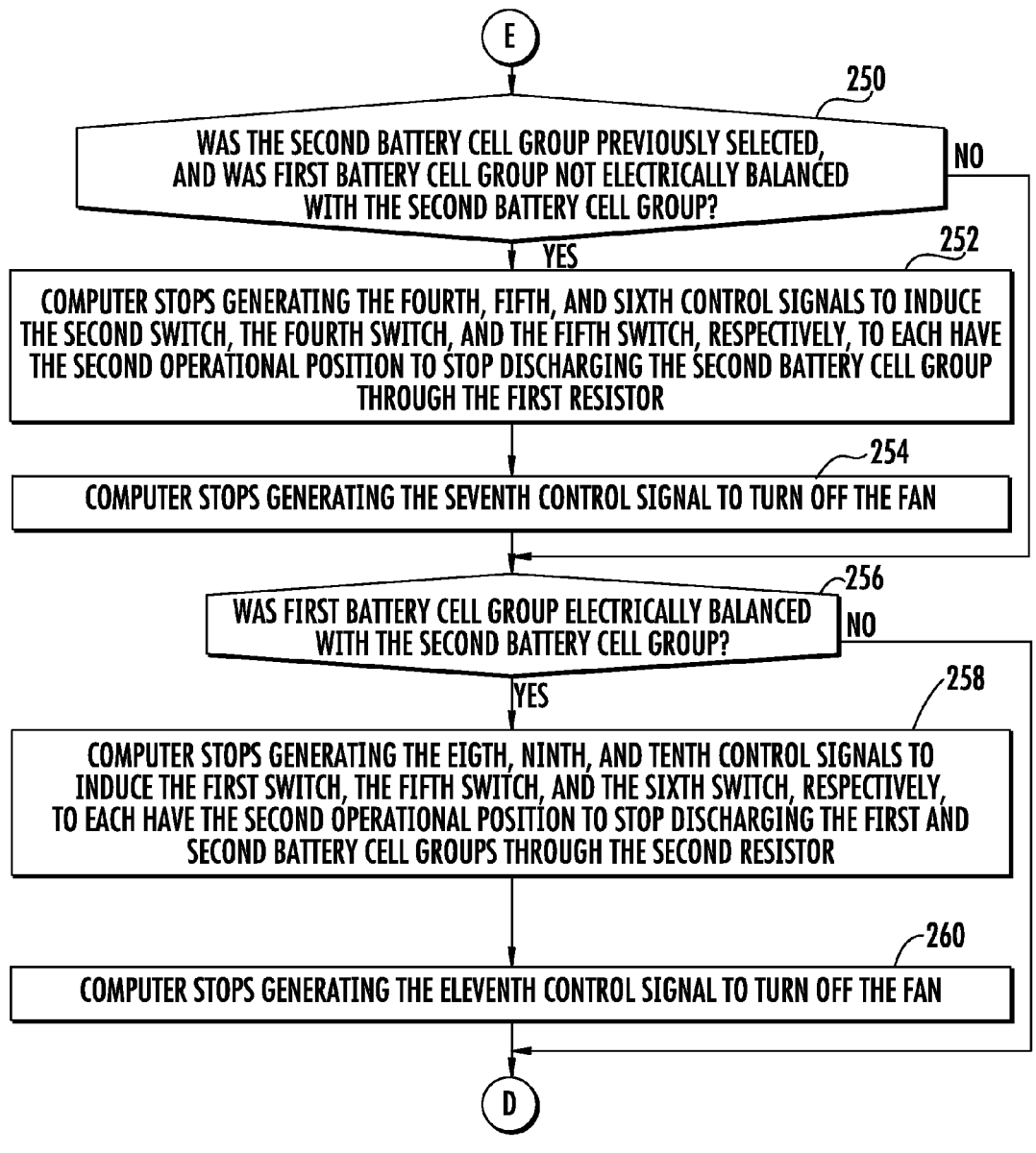

Referring to FIGS. 2-4, a flowchart of a method for heating the battery module 20 in accordance with another exemplary embodiment is provided.

At step 200, the first voltage sensor 110 generates a first signal indicative of a first voltage level being output by the first battery cell group 30. After step 200 the method advances to step 202.

At step 202, the second voltage sensor 32 generates a second signal indicative of a second voltage level being output by the second battery cell group 32. After step 202, the method advances to step 204.

At step 204, the temperature sensor 114 generates a temperature signal indicative of a temperature level of at least one of the first battery cell group 30 and the second battery cell group 32. After step 204, the method advances to step 206.

At step 206, the computer 140 makes a determination as to whether the temperature level is less than a threshold temperature level. In an exemplary embodiment, the threshold temperature level is within a temperature range of 0-10° C.

In another exemplary embodiment, the threshold temperature level is 10° C. Of course, the threshold temperature level could be less than 0° C. or greater than 10° C. If the value of step 206 equals "yes", the method advances to step 208. Otherwise, the method advances to step 236.

At step 208, the computer 140 makes a determination as to whether the first battery cell group 30 is electrically balanced with the second battery cell group 32. If the value of step 208 equals "no", the method advances to step 210. Otherwise, the method advances to step 232.

At step 210, the computer 140 selects at least one of the first and second battery cell groups 30, 32 to be at least partially discharged. After step 210, the method advances to step 212.

At step 212, the computer 140 makes a determination as to whether the first battery cell group 30 is selected. If the value of step 212 equals "yes", the method advances to step 214. Otherwise, the method advances to step 216.

At step 214, the computer 140 generates first, second, and third control signals to induce first, second, and third switches 74, 76, 80, respectively, to each have the first operational position to at least partially discharge the first battery cell group 30 through the first resistor 70 to generate heat energy in the first resistor 70. After step 214, the method advances to step 216.

At step 216, the computer 140 makes a determination as to whether the second battery cell group 32 is selected. If the value of step 216 equals "yes", the method advances step 218. Otherwise, the method advances to step 230.

At step 218, the computer 140 generates fourth, fifth, and sixth control signals to induce the second switch 76, the fourth switch 82, and the fifth switch 84, respectively, to each have the first operational position to at least partially discharge the second battery cell group 32 through the first resistor 70. After step 218, the method advances to step 230.

At step 230, the computer 140 generates a seventh control signal to turn on the fan 116 to distribute the heat energy from the first resistor 70 in the battery module 20 to increase the temperature level of the battery module 20. After step 230, the method returns to step 200.

Referring again to step 208, when the value of step 208 equals "yes", the method advances to step 232. At step 232, the computer 140 generates eighth, ninth, and tenth control signals to induce the first switch 74, the fifth switch 84, and the sixth switch 86, respectively, to each have the first operational position to at least partially discharge the first and second battery cell group 30, 32 through the second resistor 72 to generate heat energy in the second resistor 72. After step 232, the method advances to step 234.

At step 234, the computer 140 generates an eleventh control signal to turn on the fan 116 to distribute the heat energy from the second resistor 72 in the battery module 20 to increase the temperature level of the battery module 20. After step 234, the method returns to step 200.

Referring again to step 206, when the value of step 206 equals "no", the method advances to step 236. At step 236, the computer 140 makes a determination as to whether the first battery cell group 30 was previously selected, and whether the first battery cell group 30 was not electrically balanced with the second battery cell group 32. If the value of step 236 equals "yes", the method advances to step 238. Otherwise, the method advances to step 250.

At step 238, the computer 140 stops generating the first, second, and third control signals to induce the first, second, and third switches 74, 76, 80, respectively, to each have a second operational position to stop discharging the first battery cell group 30 through the first resistor 70. After step 238, the method advances to step 240.

At step 240, the computer 140 stops generating the seventh control signal to turn off the fan 116. After step 240, the method advances to step 250.

At step 250, the computer 140 makes a determination as to whether the second battery cell group 32 was previously selected and whether the first battery cell group 30 was not electrically balanced with the second battery cell group 32. If the value of step 250 equals "yes", the method advances to step 252. Otherwise, the method advances to step 256.

At step 252, the computer 140 stops generating the fourth, fifth, and sixth control signals to induce the second switch 76, the fourth switch 82, and the fifth switch 84, respectively, to each have the second operational position to stop discharging the second battery cell group 32 through the first resistor 70. After step 252, the method advances to step 254.

At step 254, the computer 140 stops generating the seventh control signal to turn off the fan 116. After step 254, the method advances to step 256.

At step 256, the computer 140 makes a determination as to whether the first battery cell group 30 is electrically balanced with the second battery cell group 32. If the value of step 256 equals "yes", the method advances to step 258. Otherwise, the method returns to step 200.

At step 258, the computer 140 stops generating the eighth, ninth, and tenth control signals to induce the first switch 74, the fifth switch 84, and the sixth switch 86, respectively, to each have the second operational position to stop discharging the first and second battery cell groups 30, 32 through the second resistor 72. After step 258, the method advances to step 260.

At step 260, the computer 140 stops generating the eleventh control signal to turn off the fan 116. After step 260, the method returns to step 200.

Referring to FIGS. 2 and 6, in another exemplary embodiment, the step 210 is implemented utilizing a step 270. At step 270, the computer 140 selects the first battery cell group 30 if the first voltage level is greater than the second voltage level based on the first and second signals.

In another exemplary embodiment, the step 210 is implemented utilizing a step 280. At step 280, the computer 140 selects the second battery cell group 32 if the second voltage level is greater than the first voltage level based on the first and second signals.

In another exemplary embodiment, the step 210 is implemented utilizing a step 290. At step 290, the computer 140 selects the first battery cell group 30 if a first state-of-charge of the first battery cell group 30 is greater than a second state-of-charge of the second battery cell group 32. A state of charge of a battery cell group can be determined utilizing the following equation: state-of-charge=f(output voltage, temperature level of battery cell group). It should be noted that an output voltage of a battery cell group corresponds to an output voltage of a battery cell in the battery cell group. Also, a temperature level of a battery cell group corresponds to a temperature level of a battery cell in the battery cell group.

In another exemplary embodiment, the step 210 is implemented utilizing a step 300. At step 300, the computer 140 selects the second battery cell group 32 if a first state-of-charge of the second battery cell group 32 is greater than a second state-of-charge of the first battery cell group 30.

The heating system 10 for the battery module 20 and the method for heating the battery module 20 provide a substantial advantage over other heating systems and methods. In particular, the heating system 10 and method utilize balancing resisters in the heating system for generating heat energy to increase the temperature of the battery module greater than or equal to a threshold temperature level while electrically balancing battery cells in the battery module 20.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A heating system for a battery module, the battery module having first and second battery cell groups, the first battery cell group having at least first and second battery cells electrically coupled in parallel with one another between a first node and a second node, the second battery cell group having at least third and fourth battery cells electrically coupled in parallel with one another between the second node and a third node, comprising:
   a first voltage sensor configured to generate a first signal indicative of a first voltage level being output by the first battery cell group, the first voltage sensor being electrically coupled to and between the first node and the second node;
   a second voltage sensor configured to generate a second signal indicative of a second voltage level being output by the second battery cell group, the second voltage sensor being electrically coupled to and between the second node and the third node;
   a series combination of a first resistor and first, second, and third switches being electrically coupled in series between the first node and the second node, the first resistor being electrically coupled in parallel to the first battery cell group when the first, second, and third switches each have a first operational position to discharge the first battery cell group through the first, second, and third switches and the first resistor;
   a temperature sensor configured to generate a temperature signal indicative of a temperature level of at least one of the first battery cell group and the second battery cell group;
   a computer operably coupled to the first voltage sensor, the second voltage sensor, and the temperature sensor such that the computer receives the first signal, the second signal, and the temperature signal, respectively;
   the computer further programmed to select the first battery cell group to be at least partially discharged if both the first voltage level is greater than the second voltage level, and the temperature level is less than the threshold temperature level;
   the computer further programmed to generate first, second, and third control signals to induce the first, second, and third switches, respectively, to each have the first operational position to at least partially discharge the first battery cell group through the first resistor to generate heat energy in the first resistor, if the first battery cell group is selected; and
   the computer further programmed to generate a fourth control signal to turn on a fan to distribute the heat energy in the battery module to increase the temperature level of the battery module.

2. The heating system of claim 1, wherein:
   the computer further programmed to stop generating the first, second, and third control signals to induce the first, second, and third switches, respectively, to each have a second operational position to stop discharging the first battery cell group through the first resistor, if the temperature level is greater than or equal to the threshold temperature level; and
   the computer further programmed to stop generating the fourth control signal to turn off the fan.

3. The heating system of claim 1, wherein a second resistor is configured to be electrically coupled to the second battery cell group when the second switch, a fourth switch, and a fifth switch each have the first operational position; the computer further programmed to select the second battery cell group if the second voltage level is greater than the first voltage level, and the temperature level is less than the threshold temperature level; and
   the computer further programmed to generate fifth, sixth, and seventh control signals to induce the second switch, the fourth switch, and the fifth switch, respectively, to have the first operational position to at least partially discharge the second battery cell group through the first resistor, if the second battery cell group is selected.

4. The heating system of claim 1, wherein:
   the computer further programmed to generate fifth, sixth, and seventh control signals to induce the first switch, a fifth switch, and a sixth switch, respectively, to each have the first operational position to at least partially discharge both the first and second battery cell groups through a second resistor to generate heat energy in the second resistor, if both the first voltage level is substantially equal to the second voltage level, and the temperature level is less than the threshold temperature level; and
   the computer further programmed to generate an eighth control signal to turn on the fan to distribute the heat energy from the second resistor in the battery module.

5. The heating system of claim 1, further comprising:
   a housing enclosing the first resistor, the temperature sensor, the first and second voltage sensors, and the first, second, and third switches therein; and
   the computer being disposed outside of the housing.

6. A heating system for a battery module, the battery module having first and second battery cell groups, the first battery cell group having at least first and second battery cells electrically coupled in parallel with one another between a first node and a second node, the second battery cell group having at least third and fourth battery cells electrically coupled in parallel with one another between the second node and a third node, comprising:
   a first voltage sensor configured to generate a first signal indicative of a first voltage level being output by the first battery cell group, the first voltage sensor being electrically coupled to and between the first node and the second node;

a second voltage sensor configured to generate a second signal indicative of a second voltage level being output by the second battery cell group, the second voltage sensor being electrically coupled to and between the second node and the third node;

a series combination of a first resistor and first, second, and third switches being electrically coupled in series between the first node and the second node, the first resistor being electrically coupled in parallel to the first battery cell group when the first, second, and third switches each have a first operational position to discharge the first battery cell group through the first, second, and third switches and the first resistor;

a temperature sensor configured to generate a temperature signal indicative of a temperature level of at least one of the first battery cell group and the second battery cell group;

a computer operably coupled to the first voltage sensor, the second voltage sensor, and the temperature sensor such that the computer receives the first signal, the second signal, and the temperature signal, respectively;

the computer programmed to determine a first state-of-charge of the first battery cell group based on the first voltage level, and a second state-of-charge of the second battery cell group based on the second voltage level;

the computer further programmed to select the first battery cell group to be at least partially discharged if both the first state-of-charge is greater than the second state-of-charge, and the temperature level is less than the threshold temperature level, and;

the computer further programmed to generate first, second, and third control signals to induce the first, second, and third switches, respectively, to each have the first operational position to at least partially discharge the first battery cell group through the first resistor to generate heat energy in the first resistor, if the first battery cell group is selected; and the computer further programmed to generate a fourth control signal to turn on a fan to distribute the heat energy in the battery module to increase the temperature level of the battery module.

7. The heating system of claim 6, wherein the computer further programmed to stop generating the first, second, and third control signals to induce the first, second, and third switches, respectively, to each have a second operational position to stop discharging the first battery cell group through the first resistor, if the temperature level is greater than or equal to the threshold temperature level; and the computer further programmed to stop generating the fourth control signal to turn off the fan.

8. The heating system of claim 6, wherein a second resistor is configured to be electrically coupled to the second battery cell group when the second switch, a fourth switch, and a fifth switch each have the first operational position;

the computer further programmed to select the second battery cell group if both the second state-of-charge is greater than the first state-of-charge, and the temperature level is greater than or equal to the threshold temperature level; and the computer further programmed to generate fifth, sixth, and seventh control signals to induce the second switch, the fourth switch, and the fifth switch, respectively, to each have the first operational position to at least partially discharge the second battery cell group through the first resistor, if the second battery cell group is selected.

9. The heating system of claim 6, wherein the computer further programmed to generate fifth, sixth, and seventh control signals to induce the first switch, a fifth switch, and a sixth switch, respectively, to each have the first operational position to at least partially discharge both the first and second battery cell groups through a second resistor to generate heat energy in the second resistor, if the first state-of-charge is substantially equal to the second state-of-charge, and the temperature level is less than the threshold temperature level; and the computer further programmed to generate an eighth control signal to turn on the fan to distribute the heat energy from the second resistor in the battery module.

10. The heating system of claim 6, further comprising:

a housing enclosing the first resistor, the temperature sensor, the first and second voltage sensors, and the first, second, and third switches therein; and the computer being disposed outside of the housing.

11. A heating system for a battery module, the battery module having first and second battery cell groups, the first battery cell group having at least first and second battery cells electrically coupled in parallel with one another between a first node and a second node, the second battery cell group having at least third and fourth battery cells electrically coupled in parallel with one another between the second node and a third node, comprising:

a first voltage sensor configured to generate a first signal indicative of a first voltage level being output by the first battery cell group, the first voltage sensor being electrically coupled to and between the first node and the second node;

a second voltage sensor configured to generate a second signal indicative of a second voltage level being output by the second battery cell group, the second voltage sensor being electrically coupled to and between the second node and the third node;

a series combination of a first resistor and first, second, and third switches being electrically coupled in series between the first node and the second node, the first resistor being electrically coupled in parallel to the first battery cell group when the first, second, and third switches each have a first operational position to discharge the first battery cell group through the first, second, and third switches and the first resistor;

a temperature sensor configured to generate a temperature signal indicative of a temperature level of at least one of the first battery cell group and the second battery cell group;

a computer operably coupled to the first voltage sensor, the second voltage sensor, and the temperature sensor such that the computer receives the first signal, the second signal, and the temperature signal, respectively;

the computer programmed to select the first battery cell group to be at least partially discharged if both the first voltage level is greater than the second voltage level, and the temperature level is less than the threshold temperature level, and;

the computer further programmed to generate first, second, and third control signals to induce the first, second, and third switches, respectively, to each have the first operational position to at least partially discharge the first battery cell group through the first resistor to generate heat energy in the first resistor, if the first battery cell group is selected; and the computer further programmed to stop generating the first, second, and third control signals to induce the first, second, and third switches, respectively, to each have a second operational position to stop discharging the first battery cell group through the first resistor, if the temperature level is greater than or equal to the threshold temperature level.

12. The heating system of claim 11, wherein:

the computer further programmed to select the second battery cell group to be at least partially discharged if both the second voltage level is greater than the first voltage level, and the temperature level is less than the threshold temperature level; and the computer further programmed to generate fourth, fifth, and sixth control signals to induce the second switch, a fourth switch, and a fifth switch, respectively, to each have the first operational position to at least partially discharge the second battery cell group through the first resistor, if the second battery cell group is selected.

\* \* \* \* \*